United States Patent
L (10) Patent No.: US 9,594,903 B1
(45) Date of Patent: Mar. 14, 2017

(54) REPUTATION SCORING OF SOCIAL NETWORKING APPLICATIONS

(75) Inventor: Yamini L, Chennai (IN)

(73) Assignee: Symantec Corporation, Mountain View, CA (US)

( * ) Notice: Subject to any disclaimer, the term of this patent is extended or adjusted under 35 U.S.C. 154(b) by 332 days.

(21) Appl. No.: 13/408,000

(22) Filed: Feb. 29, 2012

(51) Int. Cl.
G06F 21/00 (2013.01)
G06F 21/56 (2013.01)
G06F 21/57 (2013.01)

(52) U.S. Cl.
CPC .......... G06F 21/561 (2013.01); G06F 21/577 (2013.01)

(58) Field of Classification Search
CPC .............................. G06F 21/561; G06F 21/577
USPC .......................................................... 726/22
See application file for complete search history.

(56) References Cited

U.S. PATENT DOCUMENTS

2006/0085664 A1* 4/2006 Nakamura et al. ................ 714/1
2006/0090192 A1* 4/2006 Corby et al. ....................... 726/1
2010/0077445 A1* 3/2010 Schneider et al. ................ 726/1
2011/0047594 A1* 2/2011 Mahaffey et al. ................ 726/1
2011/0087777 A1* 4/2011 Sakai et al. .................... 709/224
2013/0042294 A1* 2/2013 Colvin et al. ..................... 726/1

* cited by examiner

*Primary Examiner* — Brandon Hoffman
*Assistant Examiner* — Thong Truong
(74) *Attorney, Agent, or Firm* — Wilmer Cutler Pickering Hale and Dorr LLP (57) ABSTRACT

A method and apparatus for reputation scoring of applications on social networking services is described. A reputation score system scans a profile area of an application operating in a social networking service and generates a profile metric based on the content of the profile area. A reputation score system scans analyzes application installation behavior of an application and generates an installation metric. The reputation score system analyzes application activity of the application and generating an application metric. The reputation score system analyzes permissions requested by the application and generates a permissions metric. The reputation score system generates a reputation based on the profile metric, installation metric, application metric and permissions metric.

20 Claims, 5 Drawing Sheets

FIG. 5

REPUTATION SCORING OF SOCIAL NETWORKING APPLICATIONS

TECHNICAL FIELD

Embodiments of the invention relate to the field of processing data, and more particularly, to reputation scoring of social networking applications.

BACKGROUND OF THE INVENTION

A social networking service is an online service, platform, or service that focuses on building and reflecting social networks or social relations among people, who, for example, share interests and/or activities. A social network service typically includes a representation of each user (often a user profile), his/her social links, and a variety of additional services. Most social network services are web-based and provide means for users to interact over the Internet, such as via posts, e-mail, and instant messaging. Social networking services allow users to share ideas, activities, events, and interests within their individual networks.

The main types of social networking services are those that contain category places (such as former school year or classmates), means to connect with friends (usually with self-description pages), and a recommendation system linked to trust. Popular methods now combine many of these, with Facebook®, LinkedIn®, Google+®, and Twitter® services widely used worldwide, The Sphere (The Luxury Network®), Nexopia® (mostly in Canada); Bebo®, VKontakte, Hi5®, Hyves (mostly in The Netherlands), Draugiem.lv (mostly in Latvia), StudiVZ (mostly in Germany), iWiW (mostly in Hungary), Tuenti® (mostly in Spain), Nasza-Klasa (mostly in Poland), Decayenne, Tagged®, XING, Badoo® and Skyrock® services in parts of Europe; Orkut® and Hi5® in South America and Central America; and Mixi®, Multiply®, Orkut®, Wretch, Renren and Cyworld® services in Asia and the Pacific Islands and Facebook®, Twitter®, LinkedIn® and Google+® services are very popular in India and Pakistan.

Social networking services share some conventional features. Most often, individual users are encouraged to create profiles containing information about themselves. Users can often upload pictures of themselves to their profiles, post blog entries for others to read, search for other users with similar interests, and compile and share lists of contacts. In addition, user profiles often have a section dedicated to comments from friends and other users. To protect user privacy, social networks usually have controls that allow users to choose who can view their profile, contact them, add them to their list of contacts, and so on. Of course social networking services may provide various additional features.

The popularity and population of social networking service such as Facebook® has experienced an astronomical growth in recent years, reaching close to one billion online users and ever increasingly connected. Unfortunately, it might also be a lucrative and prime target for hackers and cyber criminals to install malicious software on a user's computer. Currently, most malicious software is delivered to a user's machine through social networking sites. Typically, a user's computer is infested by merely clicking on a malicious URL, or by authorizing a malicious application to access the user's personal data.

These malicious applications spread through social networking sites because more people are using the sites and users trust that a friend would not provide links to or otherwise share malicious applications. A user who unknowingly installs such applications tends to get infested and spread their infestation widely across their network of friends or connections. However, many applications go to the extent of obtaining chat permissions for maliciously posting URLs to friend's chat area or wall.

SUMMARY OF THE INVENTION

A method and apparatus for reputation scoring of applications on social networking services is described. A reputation scoring system provides a user with a reputation label, such as secure or malicious, by analyzing and generating performance and attribute metrics that predict the security of the applications.

In one embodiment of the method includes analyzing application installation behavior of an application and generating an installation metric, and analyzing application activity of the application and generating an application activity metric. In another embodiment, the method includes analyzing permissions requested by the application and generating permissions metric, and generating a reputation based on the profile metric, installation metric, application activity metric, and permissions metric.

In another further embodiment, the method includes identifying the application as a secure application if the reputation score is one of greater than or less than a threshold score. In one embodiment, the method also includes blocking a user from installing the application if the reputation score is indicative of a malicious application. The method may include scanning a profile area of the application and generating a profile metric based on the content of the profile area. The reputation score may be the sum of the profile metric, installation metric, application activity metric, and permissions metric.

The method may also include notifying the user of a reputation of the application, and maintaining a data store comprising a plurality of application reputations. In yet another embodiment, the method includes installing, if the application is not in the data store, the application in the profile area.

In addition, a computer readable storage medium for identifying information as protected information is described. An exemplary computer readable storage medium provides instructions, which when executed on a processing system causes the processing system to perform a method such as the exemplary methods discussed above.

Further, systems and apparatus of a reputation scoring system are described. An exemplary apparatus may include a memory and a processor coupled to the memory. The processor is configured to execute the reputation scoring system to perform various operations, such as those described above.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

A method and apparatus for providing a reputation for social networking applications to alert a user about insecure or malicious applications is described. In the following description, numerous details are set forth. It will be apparent, however, to one of ordinary skill in the art having the benefit of this disclosure, that embodiments of the present invention may be practiced without these specific details.

Figure 1:
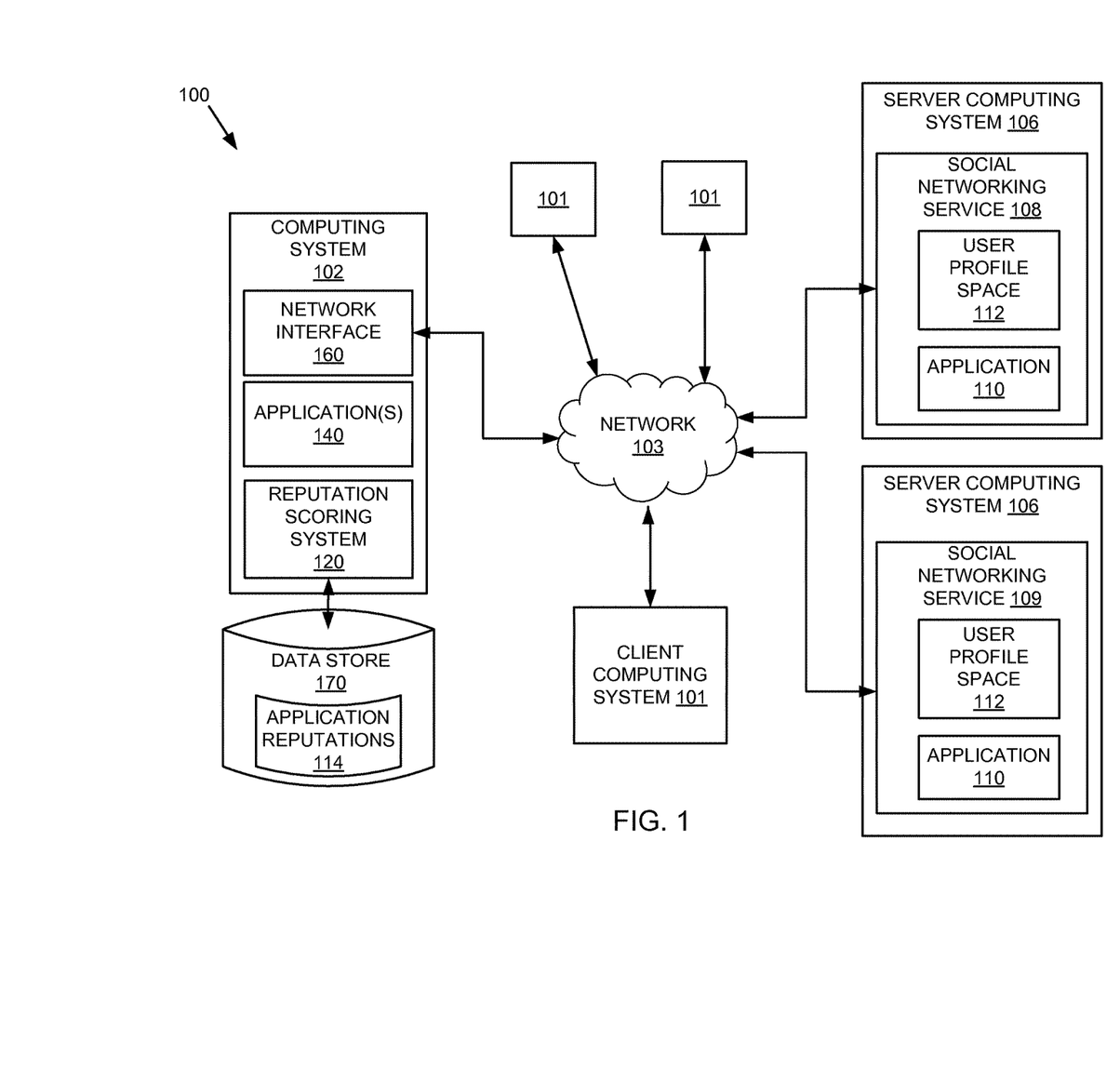
FIG. 1 is a block diagram of exemplary network architecture in which embodiments of a reputation scoring system may operate.

FIG. 1 is a block diagram of an exemplary network architecture 100 in which embodiments of a reputation scoring system 120 may operate. The network architecture 100 may include multiple client computing systems 101, a computing system 102 that hosts the reputation scoring system 120, and one or more server computing systems 106 coupled via a network 103 (e.g., public network such as the Internet or private network such as a local area network (LAN)). The client computing systems 101 and the computing system 102 may include personal computers, laptops, PDAs, mobile phones, network appliances, etc. The server computing system 106 may be a network appliance, a gateway, a personal computer, etc. The computing systems 101, 102, 106 may reside on the same LAN, or on different LANs that may be coupled together via the Internet, but separated by firewalls, routers, and/or other network devices.

In another embodiment, the computing systems 101, 102, 106 may reside on different networks. In the depicted embodiment, one of the server computing systems 106 may host a first social networking service 108, and another one of the server computing systems 106 may host a second social networking service 109. The social networking services 108 and 109 may be online services, platform, website, or any combination thereof that focuses on building and reflecting of social networks or social relations among people, who, for example, share interests and/or activities.

A social network service provides a representation of each user (often a profile), his/her social links, and a variety of additional services. Most social network services are web-based and provide means for users to interact over the Internet, such as via posts, e-mail, and instant messaging. These social networking services may be online community services that are group-centered, or may be individual-centered services. The social networking services 108 and 109 may be Facebook. LinkedIn, Google+, Twitter, The Sphere (luxury network), Nexopia; Bebo, VKontakte, Hi5, Hyves, Draugiem.lv, StudiVZ, iWiW, Tuenti, Nasza-Klasa, Decayenne, Tagged, XING, Badoo and Skyrock; Orkut and Hi5; and Mixi, Multiply, Orkut, Wretch, renren and Cyworld. Alternatively, the social networking services 108 and 109 may be other types of social networking services. Although the depicted embodiment illustrates the reputation scoring system 120 as residing on a single machine, alternatively, the functionality of the reputation scoring system 120 can be distributed over the two or more machines. For example, the reputation scoring system 120 may reside in a client computing system 101 and access a data store 170 over the network 103. Alternatively, other configurations are possible as would be appreciated by one of ordinary skill in the art having the benefit of this disclosure. For example, the reputation scoring system 120 may operate as a service, process, or application in a cloud computing environment connected with the network 103.

In one embodiment, the client computing systems 101 are used by users of the first social networking service 108, the second social networking service 109, or both. The computing system 102 may be in the same organization as the server computing system or may be a third-party organization. For example, an administrator of a third-party may configure the computing system 102 to provide the reputation scoring services to the users of the social networking services, as a separate service than those provided by the social networking service. In other configurations, the reputation scoring system 120 can be integrated into services provided by the social networking services 108, 109, or both.

The reputation scoring system 120 is configured to assign a reputation to an application that operates in a social networking service 108, 109 and indicate to a user if the application is secure as opposed to insecure or suspicious. As described above, social networking services have become the targets for hackers and cyber criminals. Some of the social networking services may provide limited protection using blacklist detection of specific applications, or rely on violation reports from users, which are clearly insufficient. The embodiments of the reputation scoring system 120 may provide an improved social networking service, and may prevent one or more malicious techniques for tricking web uses on social networking services.

For example, one malicious technique involves tricking web users into installing a malicious application. A majority of malicious applications are currently installed through social networking services. These malicious applications trick a user into authorizing the malicious application to access the user's personal data, and thereby allow the malicious application to spread to the user's contacts. A contact or friend believes the malicious application is recommended by the user and as such, installs the malicious application. Consequently, the malicious application continues to spread among social networking services 108, 109.

The reputation scoring system 120 can communicate with the social networking service 108, 109 over the network 103. The reputation scoring system 120 can retrieve posts made by public users, posts made by particular users, or the like. The reputation scoring system 120 can receive news feeds for the posts, or may receive one or more posts at a time from the social networking services, and subsequently analyze the news feeds or posts for updates from applications 110. Applications 110 are, in one example, web-based applications that are loaded in the social network service. Examples of applications include, but are not limited to, applications that alter the layout of the social network service, games playable within the social network service, plugins that add functionality to the social network service (e.g. video chat), etc. The user grants the application 110 permission to access the user's user profile space 112, including but not limited to, posts or updates made by the user, the user's contacts, etc.

Although the embodiments may be used for malicious application detection in social networking services, the embodiments of the reputation scoring system 120 can be used in other contexts where a website, platform, or service is susceptible to malicious applications as would be appreciated by one of ordinary skill in the art having the benefit of this disclosure. In the depicted embodiment, the reputation scoring system 120 is run on the computing system 102. Although not depicted in FIG. 1, in another embodiment, the reputation scoring system 120 is run on the server computing system 106. Alternatively, some of the functionality of the reputation scoring system 120 may be performed on the computing system 102, while other functionality of the reputation scoring system 120 is performed on the server computing system 106. In other embodiments, the reputation scoring system 120 may be implemented at least partially on the client computing system 101. It should also be noted that the reputation scoring system 120 can be implemented in other configurations, such as within the social networking service 108. Also, the embodiments described herein may be used in other applications that can be used for performing reputation scoring system operations as would be appreciated by one of ordinary skill in the art having the benefit of this disclosure.

In one embodiment, the reputation scoring system 120 monitors recent public posts on the social networking services 108, 109. The reputation scoring system 120 is configured to detect and classify posts by applications as secure, suspicious, or malicious and update application reputation records 114 accordingly. Once an application 110 is classified as suspicious, the reputation scoring system 120 can notify one or more users that the application 110 is suspicious before the application is installed or granted access to the user profile space 112. If the reputation scoring system 120 detects the application 110 as insecure or malicious, the reputation scoring system 120 may prevent the application 110 from propagating through the social networking service, or may reduce the exposure of the application.

Although only one server computing system 106 is illustrated in FIG. 1, the social networking service 108 may be hosted on one or more machines, including one or more server computers, client computers, gateways or other computing devices. In yet another configuration, the social networking service may reside on a single server or on different servers, coupled to other devices via a public network (e.g., the Internet) or a private network (e.g., LAN). In one embodiment, the social networking service 108 is part of an organization's system referred to herein as entity. In another embodiment, a service provider hosts the social networking service 108. The hosted service provider may also have multiple instances of the social networking service 108 on multiple networks that communicate with the service provider over a public or private network. It should be noted that various other network configurations can be used including, for example, hosted configurations, distributed configurations, centralized configurations, etc. The same may be true for the server computing system 106 that host the social networking service 109.

The depicted computing system 102 may operate as an endpoint machine in an enterprise network that uses the reputation scoring system 120 to detect applications on the social networking service 108 (or 109). The computing system 102 may include applications 140 and network interfaces 160 that can be used to monitor for applications 110 as would be appreciated by one of ordinary skill in the art having the benefit of this disclosure. The applications 140 are programs or services operating within the computing system 102, for example, operating within an operating system of the computing system 102. Conversely, as described above, application 110 operates within the social networking service 108.

As described above, the computing system 102 may also include a data store 170, which can be one or more centralized or remote data repositories that store the application reputation information 114. The data store 170 may represent a single or multiple data structures (databases, repositories, files, etc.) residing on one or more mass storage devices, such as magnetic or optical storage based disks, tapes or hard drives. Although illustrated as being coupled to the computing system 102, the data store 170 may be remote from the computing system 102 and the computing system 102 can communicate with the data store 170 over a public or private network. It should be noted that the computing system 102 may have both a local and remote data stores 170 or may have one or the other as would be appreciated by one of ordinary skill in the art having the benefit of this disclosure.

Figure 2:
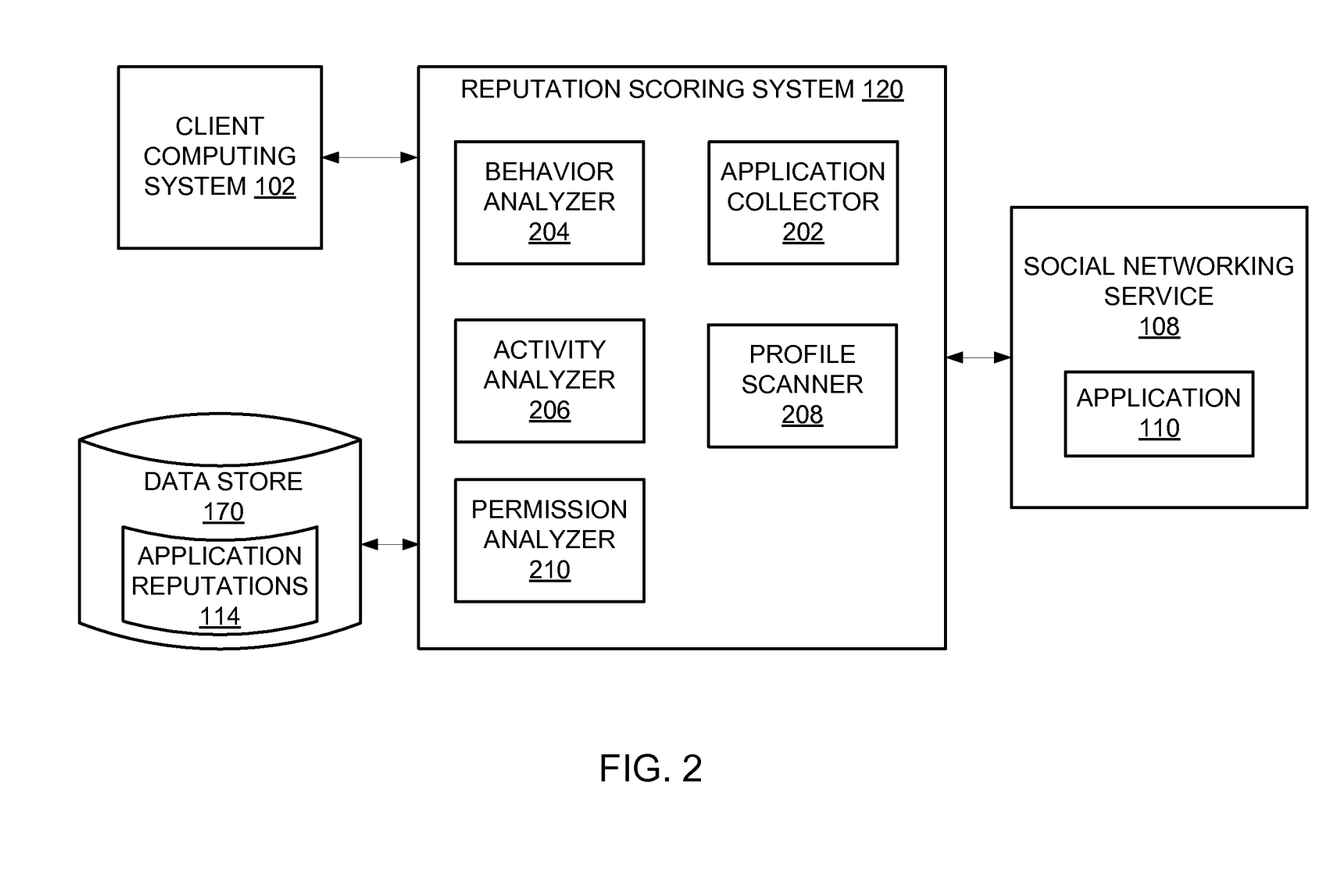
FIG. 2 is a block diagram of one embodiment of a reputation scoring system, including a behavior analyzer, an activity analyzer, a permission analyzer, profile scanner and an application collector to classify one or more applications of a social networking service as malicious.

FIG. 2 is a block diagram of one embodiment of a reputation scoring system 120, including a behavior analyzer 204, an activity analyzer 206, a permission analyzer 210, profile scanner 208, and an application collector 202 to classify one or more applications 110 of a social networking service as malicious or secure. In a further embodiment, the reputation scoring system 120 may classify applications 110 on a scale indicative of a degree of maliciousness. For example, distinct classifications may include visual color-based indicators such as red, yellow, or green that indicate malicious, suspicious, and secure ratings, respectively. In the one embodiment, the reputation scoring system 120 is configured to analyze applications 110 operating within social networking services 108 and generate a reputation score based on various metrics. These metrics include, but are not limited to, profile space of the application 110, installation behavior of the application 110, activity behavior of the application 110, and permissions requested by the application 110.

The behavior analyzer 204 is configured to analyze the installation behavior of the application 110. The behavior analyzer 204, in one embodiment, installs any application 110 discovered by the application collector 202, which is described below. The behavior analyzer 204 may install the application in an isolated instance of the social networking service 108 to limit the spreading of the application if the application is malicious. The behavior analyzer 204 may install the application in a "sandbox" or virtual machine to isolate the application during analysis. Alternatively, the application 110 can be installed in another environment as would be appreciated by one of the skill in the art having the benefit of this disclosure.

The behavior analyzer 204 monitors the installation of the application 110 and determines what changes the application 110 makes. In one embodiment, using the Facebook® service as an example, the behavior analyzer 204 monitors any settings or permissions changes the application 110 makes to a user's profile space 112. Examples of settings or permissions can vary greatly, as on one skilled in the art will recognize, but can include settings or permissions related to a user's activities, birthday, check-ins, education history, hometown, interests, likes, notes, photos, contact information, etc., and the same or similar permissions related to the friends of the user. The behavior analyzer 204 also monitors, during installation, if the application 110 requests permission to act on behalf of the user. In other words, the behavior analyzer 204 may monitor if the application 110 requests access to a chat feature to chat with the friends of the user, or post updates on behalf of the user. Finally, the behavior analyzer 204 assigns an installation behavior metric of malicious or secure based upon the above described analysis. Alternatively, different levels of threat can be assigned for the installed behavior metric.

The activity analyzer 206 is configured, in one embodiment, to determine the purpose or intention of the application 110. The activity analyzer 204, in determining the purpose of the application 110, monitors the application 110 to determine if the application 110 is acting outside the scope of the application's 110 description. For example, if an application 110 purports to be an astrology application that posts a user's horoscope to the wall of the user, then this application 110 is operating within the scope of an astrology application. However, for example, if the astrology application is also posting malicious links, posting malicious links on friends' walls, or sending malicious links through a private message, then the astrology application is operating outside the scope of operation, and the activity analyzer 204 assigns a malicious score or ranking to the application with regard to an activity metric.

In one embodiment the permission analyzer 210 is configured to analyze the authorization details of the application 110. Authorization details may include, but are not limited to, access to a user's information such as name, profile picture, gender, networks, user ID, list of friends, access to photos and videos, and access to friends' information. As an application 110 is enabled on a social networking service 106, the application 110 generally requests certain permissions be enabled and accepted by the user. However, a malicious application 110 may exploit the permissions from the user. Typically, a malicious application 110 exploits permissions related to communicating with friends or contacts. The permission analyzer 210 determines if permissions are enabled that would allow the application to spread to the friends or connections of the user.

In a further embodiment, the permission analyzer 210 analyzes which permissions are requested/enabled for the application. For example, the permission analyzer 210 determines whether basic permissions are requested by the application, or whether the application has requested extended, or non-standard permissions. Examples of extended and atypical permissions include, but are not limited to accessing user's friends list, friends' contacts, posting on friends wall without user consent, messaging to all user contacts without user consent, requesting chat permission from user, etc. The permission analyzer 210 assigns a permission metric to the application according to the analysis. The permission analyzer 205 may assign a secure or suspicious ranking or score based on the analysis.

The profile scanner 208 is configured to analyze the profile space of the application 110 and the installation behavior of the application 110 and determine a score or rating for the profile space. In one embodiment, the profile scanner 208 scans the profile space of the application 110 to determine if the profile space includes malicious content. For example, if a wall post, to continue the example of the Facebook® service, purports to be a video file but is actually a link to an executable program, the profile scanner 208 may rank or score the post as malicious.

Typically, each application 110 has a profile space or "wall," and the profile scanner 208 is configured to scan content associated with the profile space of the application. This may include scanning posts, links, reviews, attached files, etc., to determine if any of the content is malicious. One example of a content analyzer suitable for use with the profile scanner 208 is Norton™ Safe Web service. Alternatively, the profile scanner 208 may be configured to determine if content on a profile space is malicious by comparing the type of content a post purports to be compared to the actual type of content. Repeated malicious instances of posts may result in a malicious or suspicious profile space metric instead of secure ranking or score.

The application collector 202, in one embodiment, is configured to scan user profile spaces 112 to identify and analyze applications 110 operating in the social networking service 108. The application collector 202 may, for example, scan all public user profile spaces 112 for content relating to applications 110. In other words, the application collector 202 may scan publicly available user profile spaces 112 and analyze posts to identify applications 110 for reputation scoring. Alternatively, the reputation scoring system 120 may maintain a "honeypot" of simulated user profile spaces 112. The reputation scoring system 120 may, in one embodiment, simulate user profile spaces 112 to install malicious applications and allow the activity analyzer 206 to determine the purpose of the malicious applications without the possibility of infecting real user profile spaces 112.

The reputation scoring system 120, in an embodiment, is configured to blend the metric rankings of the behavior analyzer 204, activity analyzer 206, the permission analyzer 210, and the profile scanner 208 to generate a final reputation. In one embodiment, the final reputation is a reputation score based upon normalized metrics of the behavior analyzer 204, activity analyzer 206, permission analyzer 210 and the profile scanner metric. For example, if each metric was a rating ranging from 1-10, normalizing the metric results in a score in the range of between about 0.1 and 1. Therefore, the final metric may be a rating in the range of between about 0.4 and 4. A minimum secure threshold may be predetermined according to a user's preference or tolerance. Alternatively, the minimum secure threshold may be determined according to a history of application analysis. Continuing the example, the minimum secure threshold may be set at 2, and therefore, an application is considered secure if the sum of metric results is greater than or equal to 2. One skilled in the art will recognize that the above ranges of metrics or scores are given by way of example only. In another embodiment, the reputation score is determined using averages. Alternatively, the reputation score may be computed using other calculations as would be appreciated by one of skill in the art having the benefit of this disclosure.

The reputation scoring system 120 is configured to indicate to a user the secure, suspicious, or malicious reputation of an application. In one embodiment, the reputation scoring system 120 visually indicates the reputation of the application with, for example, colors or icons that are indicative of a secure, a suspicious, or a malicious application. For example, the reputation scoring system 120 may identify an application as suspicious by highlighting in bright, flashing colors to indicate the application as suspicious. In other embodiments, the reputation scoring system 120 is configured to audibly indicate the reputation of an application. In another embodiment, the reputation scoring system 120 inserts a visual indicator in the social networking service 108 adjacent to an "install" button of the application to alert a user to the reputations score of a particular application. For example, if an application 110 has a malicious reputation score, the reputation scoring system 120 overlays the application 110 with a warning label or warning alert that the user acknowledges before installing the application 110. One of skill in the art, having the benefit of this disclosure, will appreciate the many varied methods of alerting a user that the application 110 is malicious or secure.

In another embodiment, the reputation scoring system 120 is configured to update the application reputations 112 residing on the data store 170 with the metric information from the behavior analyzer 204, activity analyzer 206, permission analyzer 206, and profile scanner 208. In a further embodiment, the reputation scoring system 120 also updates the application reputations 114 with the final reputation score.

Figure 3:
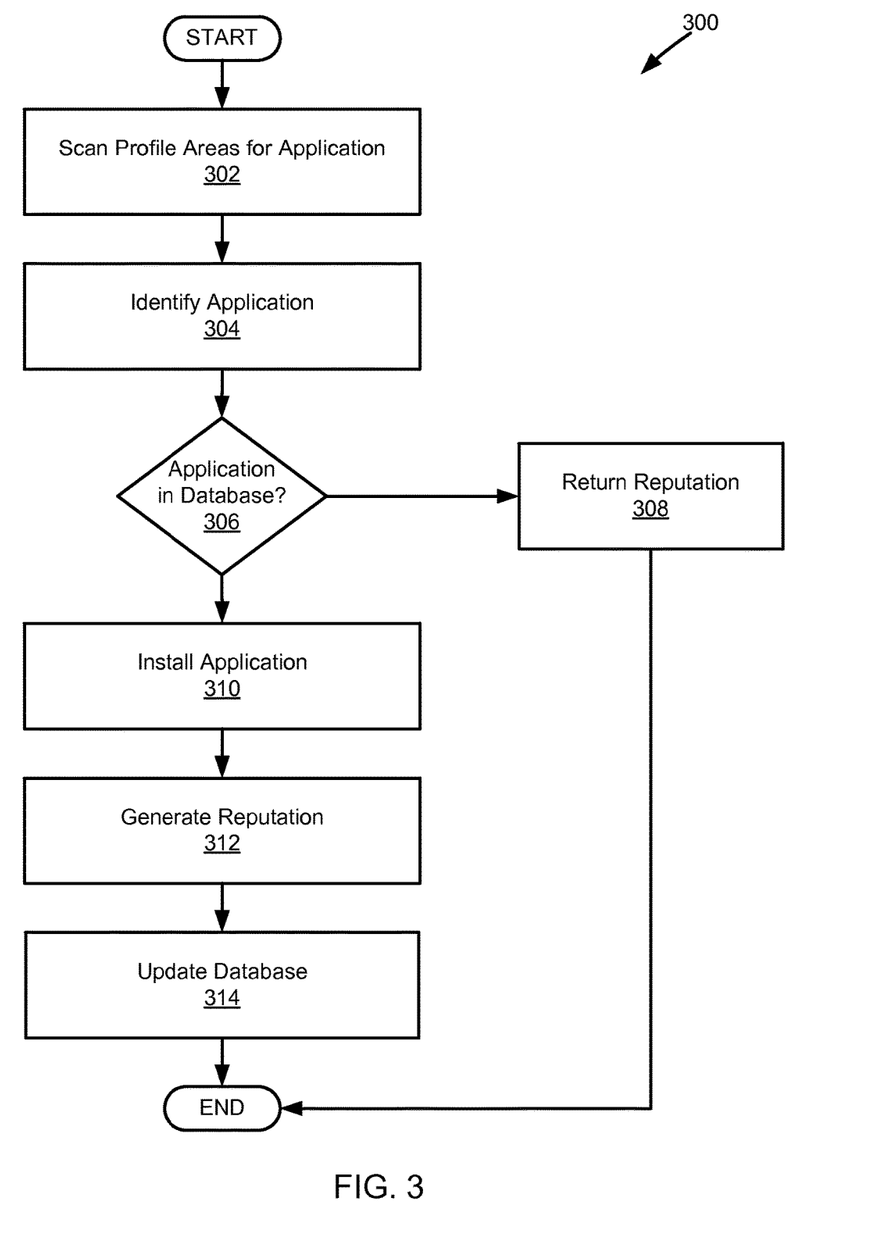
FIG. 3 is a flow diagram of one embodiment of a method of reputation scoring for an application operating in a social networking service.

FIG. 3 is a flow diagram of one embodiment of a method 300 of reputation scoring of an application operating in a social networking service. The method 300 is performed by processing logic that may comprise hardware (circuitry, dedicated logic, etc.), software (such as is run on a general purpose computing system or a dedicated machine), or a combination of both. In one embodiment, the computing system 102 of FIG. 1 performs the method 300. In another embodiment, the reputation scoring system 120 of FIGS. 1 and 2 performs the method 300. Alternatively, other components of the computing system 102, server computing system 106, or of both can be configured to perform some or all of the method 300.

Referring to FIG. 3, processing logic begins method 300 by scanning user profile areas for list of installed applications (block 302). The processing logic then identifies applications in the user profile areas (block 304). The processing logic determines if the application is in the database or data store (block 306). If the application is in the database, the processing logic returns the reputation of the application (block 308) and the method ends. If the application is not in the database or data store, the processing logic installs the application (block 310), for example, on a security service provider's infrastructure. The processing logic determines a reputation of the application (block 312), updates the database (block 314), and the method 300 ends.

In one embodiment, as part of scanning profile areas or spaces for applications at block 302, the processing logic scans publicly available user profile spaces such as those described above with reference to FIGS. 1 and 2 in search of applications operating in the social networking service. Alternatively, the processing logic scans simulated user profile spaces that are maintained to trap or isolate and evaluate applications. The processing logic, in one embodiment, scans content such as posts, updates, etc., that are generated by applications.

In another embodiment, as part of identifying an application at block 304, the process logic compares properties of an application with known properties of applications stored in the data store to identify the application. In one example, applications include a unique application identification and associated URL, and as such, the process logic may uniquely identify applications and verify if the application has already been analyzed.

In a further embodiment, if the application is not in the data store 170, the process logic installs the application. Installing the application may include the process logic installing the application in a simulated user profile space. At block 312 the process logic determines a reputation of the application. One embodiment of determining a reputation is described below in greater detail with reference to FIG. 4.

Figure 4:
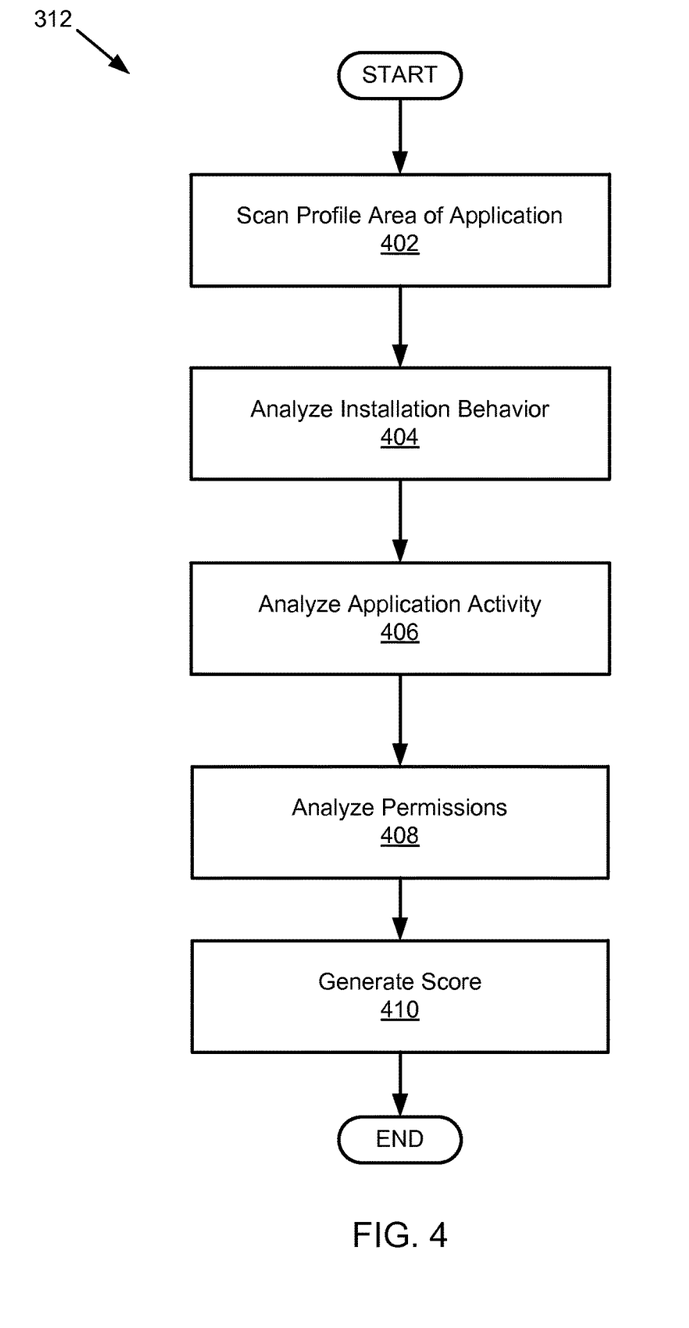
FIG. 4 is a flow diagram of one embodiment of a method of determining a reputation score of an application.

FIG. 4 is a flow diagram of one embodiment of a method 312 of determining a reputation score of an application. The method 312 is performed by processing logic that may comprise hardware (circuitry, dedicated logic, etc.), software (such as is run on a general purpose computing system or a dedicated machine), or a combination of both. In one embodiment, the computing system 102 of FIG. 1 performs the method 312. In another embodiment, the reputation scoring system 120 of FIGS. 1 and 2 performs the method 312. Alternatively, other components of the computing system 102, server computing system 106, or of both can be configured to perform some or all of the method 312.

Referring to FIG. 4, processing logic begins method 312 by scanning the profile area of the application to be analyzed (block 402). The processing logic analyzes installation behavior (block 404). The processing logic then analyzes application activity (block 406). The processing logic analyzes permissions (block 408), generates a reputation score (block 410) the method 312 ends.

In one embodiment, as part of scanning a profile area of the application at block 402, the processing logic scans the profile area or space of the application to determine if the profile space includes malicious content. This may include scanning posts, links, reviews, attached files, etc. The processing logic can use a tool, such as Norton™ Safe Web service to scan profile areas. In one embodiment, the processing logic determines a profile area metric.

In a further embodiment, as part of analyzing installation behavior at block 404, the processing logic monitors any settings or permissions requests the application makes to a user's profile space. The processing logic, at block 404, also monitors, during installation, if the application requests extended permissions to act on behalf of the user. The processing logic additionally assigns an installation behavior metric of malicious or secure based upon the above described analysis.

In one embodiment, as part of analyzing application activity at block 406, the processing logic monitors the application to determine if the application is acting outside the scope of the application's description, and assigns a malicious score or ranking to the application with regard to the activity metric In a further embodiment, as part of analyzing permissions at block 408, the processing logic analyzes the authorization details of the application. Authorization details may include, but are not limited to, access to a user's information such as name, profile picture, gender, networks, user ID, list of friends, access to photos and videos, and access to friends' information. The processing logic determines the permissions obtained by an application and if those permissions are modified according to the settings defined by the user, or if the application modifies permissions in addition to those approved by the user. The processing logic may group applications based on the permissions the applications are requesting to help measure the permissions metric.

In yet another embodiment, as part of generating a reputation score at block 410, the processing logic blends the scores or metrics of the analysis performed at blocks 402-408 and blends the scores or metrics into a final reputation. The processing logic may be configured to indicate to a user the secure, suspicious, or malicious reputation of an application.

Figure 5:
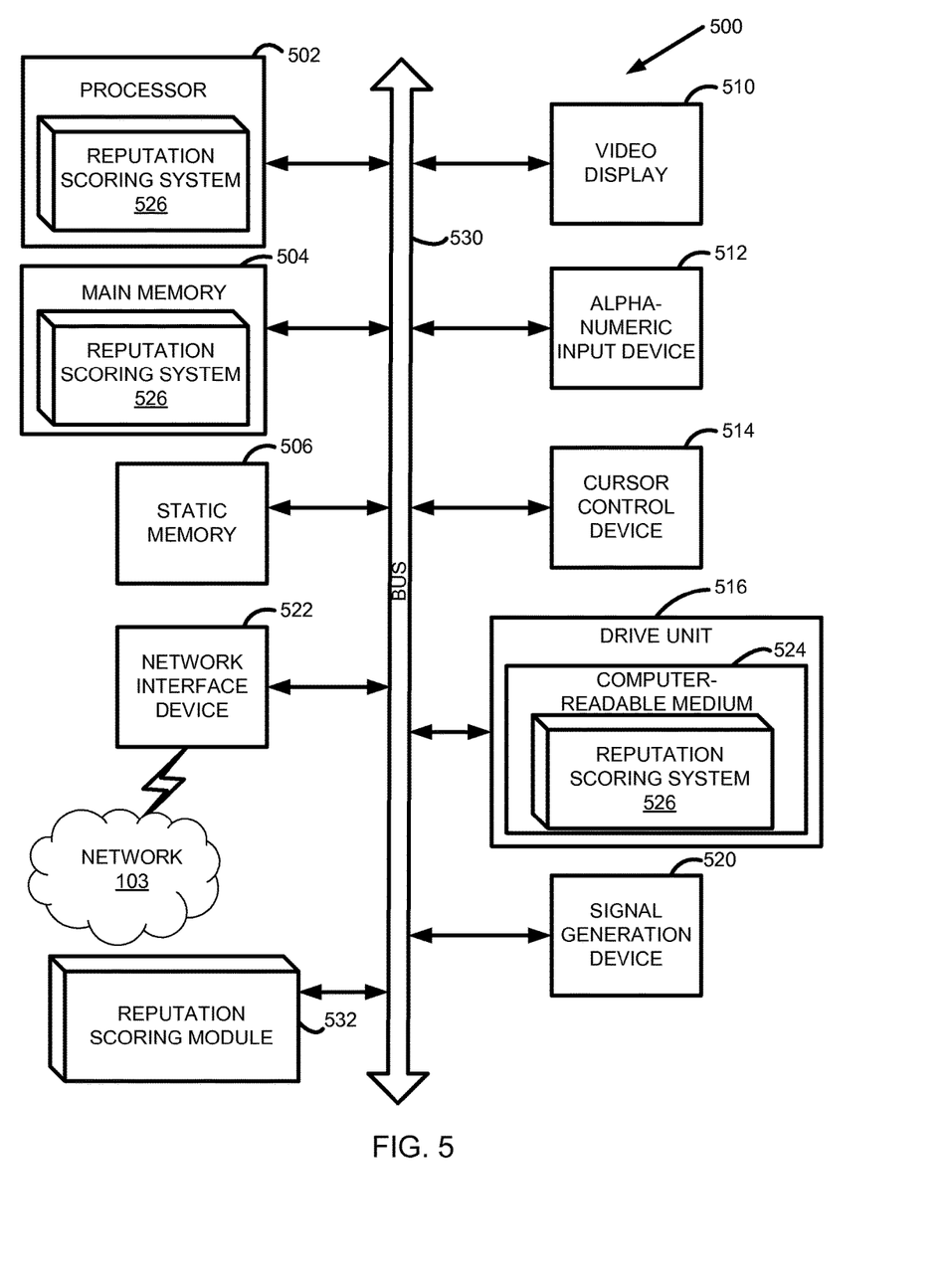
FIG. 5 illustrates a diagrammatic representation of a machine in the exemplary form of a computing system within which a set of instructions, for causing the machine to perform any one or more of the methodologies described herein, may be executed.

FIG. 5 illustrates a diagrammatic representation of a machine in the exemplary form of a computing system 500 within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as methods 300 and 312 of FIGS. 3 and 4.

The exemplary computing system 500 includes a processor 502, a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a data storage device 516, which communicate with each other via a bus 530.

Processor 502 represents one or more general-purpose processing devices such as a microprocessor, central processing unit, or the like. More particularly, the processor 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 502 may also be one or more special-purpose processing devices such as an application specific integrated circuit (ASIC), a field programmable gate array (FPGA), a digital signal processor (DSP), network processor, or the like. The processor 502 is configured to execute the processing logic for reputation score detection system 526 for performing the operations and steps discussed herein.

The computing system 500 may further include a network interface device 522. The computing system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker).

The data storage device 516 may include a computer-readable medium 524 on which is stored one or more sets of instructions (e.g., reputation score detection system 526) embodying any one or more of the methodologies or functions described herein. The reputation score detection system 526 may also reside, completely or at least partially, within the main memory 504 and/or within the processor 502 during execution thereof by the computing system 500, the main memory 504, and the processor 502 also constituting computer-readable media. The reputation score detection system 526 may further be transmitted or received over a network 103 via the network interface device 522.

While the computer-readable storage medium 524 is shown in an exemplary embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, or other types of mediums for storing the instructions. The term "computer-readable transmission medium" shall be taken to include any medium that is capable of transmitting a set of instructions for execution by the machine to cause the machine to perform any one or more of the methodologies of the present embodiments.

The reputation scoring module 532, components, and other features described herein (for example in relation to FIGS. 1-2) can be implemented as discrete hardware components or integrated in the functionality of hardware components such as ASICS, FPGAs, DSPs, or similar devices. The reputation scoring module 532 may implement operations of reputation score detection system as described herein with respect to FIGS. 3-4. In addition, the reputation scoring module 532 can be implemented as firmware or functional circuitry within hardware devices. Further, the reputation scoring module 532 can be implemented in any combination hardware devices and software components.

In the above description, well-known structures and devices are shown in block diagram form, rather than in detail, in order to avoid obscuring the present invention. Some portions of the description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "receiving", "storing", "monitoring", "creating", "generating", "sending", "intercepting," "capturing," "mapping", "generating," or the like, refer to the actions and processes of a computing system, or similar electronic computing system that manipulates and transforms data represented as physical (e.g., electronic) quantities within the computing system's registers and memories into other data similarly represented as physical quantities within the computing system's memories or registers or other such information storage, transmission or display devices.

Embodiments of the present invention also relate to an apparatus for performing the operations herein. This apparatus may be specially constructed for the required purposes, or it may comprise a general-purpose computer selectively activated or reconfigured by a computer program stored in the computer. As discussed above, such a computer program may be stored in a computer readable medium.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

It is to be understood that the above description is intended to be illustrative, and not restrictive. Many other embodiments will be apparent to those of skill in the art upon reading and understanding the above description. The scope of the invention should, therefore, be determined with reference to the appended claims, along with the full scope of equivalents to which such claims are entitled.

What is claimed is:

1. A method, implemented by a first computing system programmed to perform the following, comprising:
analyzing installation behavior of an application operating in a social networking service and generating an installation metric, wherein the social networking service comprises an online platform, wherein the installation metric is based on at least one of a setting change or a permission change, made by the application to a user profile space, during installation of the application;
analyzing application activity of the application and generating an application metric, wherein analyzing the application activity of the application comprises:
determining a purpose of the application based on a description of the application; and
assessing whether the activity of the application exceeds the purpose of the application;
analyzing permissions requested by the application and generating a permissions metric, wherein the permissions metric is based on at least one of the following permissions:
accessing a user's social networking service friend list, posting on a friend's social networking service wall without user consent, messaging to all user social networking service contacts without user consent, or requesting social networking service chat permissions; and
generating a reputation score of the application based on the installation metric, application metric, and permissions metric.

2. The method of claim 1, further comprising identifying the application as a secure application if the reputation score is one of greater than or less than a threshold score.

3. The method of claim 2, further comprising blocking installation of the application if the reputation score is indicative of a malicious application.

4. The method of claim 2, further comprising scanning a profile area of the application operating in the social networking service and generating a profile metric based on content of the profile area, and wherein the reputation score is a sum of the profile metric, installation metric, application metric, and permissions metric.

5. The method of claim 2, further comprising notifying a user of the reputation score of the application.

6. The method of claim 1, further comprising maintaining a data store comprising a plurality of application reputation scores.

7. The method of claim 6, further comprising installing, if the application is not in the data store, the application in a profile area of the application operating in the social networking service.

8. A computing system, comprising:
a memory; and
a processor coupled with the memory to execute a reputation score system to:
scan a profile area of an application operating in a social networking service and generate a profile metric based on content of the profile area, wherein the social networking service comprises an online platform;
analyze application installation behavior of the application and generate an installation metric, wherein the installation metric is based on at least one of a setting change or a permission change, made by the application to a user profile space, during installation of the application;
analyze application activity of the application and generate an application metric, wherein analyzing the application activity of the application comprises:
determining a purpose of the application based on a description of the application; and
assessing whether the activity of the application exceeds the purpose of the application;
analyze permissions requested by the application and generate a permissions metric, wherein the permissions metric is based on at least one of the following permissions:
accessing a user's social networking service friend list, posting on a friend's social networking service wall without user consent, messaging to all user social networking service contacts without user consent, or requesting social networking service chat permissions; and
generate a reputation score based on the profile metric, installation metric, application metric, and permissions metric.

9. The computing system of claim 8, wherein the reputation score system is further configured to identify the application as a secure application if the reputation score is one of greater than or less than a threshold score.

10. The computing system of claim 9, wherein the reputation score system IS further configured to block a user from installing the application if the reputation score IS indicative of a malicious application.

11. The computing system of claim 9, wherein the reputation score is a sum of the profile metric, installation metric, application metric, and permissions metric.

12. The computing system of claim 9, wherein the reputation score system is further configured to notify a user of the reputation score of the application.

13. The computing system of claim 8, wherein the reputation score system is further configured to maintain a data store comprising a plurality of application reputation scores.

14. The computing system of claim 13, further comprising installing, if the application is not in the data store, the application in the profile area.

15. A non-transitory computer readable storage medium including instructions that, when executed by a processor, cause the processor to perform operations comprising:
scanning a profile area of an application operating in a social networking service and generating a profile metric based on content of the profile area, wherein the social networking service comprises an online platform;
analyzing application installation behavior of the application and generating an installation metric, wherein the installation metric is based on at least one of a setting change or a permission change, made by the application to a user profile space, during installation of the application;
analyzing application activity of the application and generating an application metric, wherein analyzing the application activity of the application comprises:

determining a purpose of the application based on a description of the application; and assessing whether the activity of the application exceeds the purpose of the application;

analyzing permissions requested by the application and generating a permissions metric, wherein the permissions metric is based on at least one of the following permissions:

accessing a user's social networking service friend list, posting on a friend's social networking service wall without user consent, messaging to all user social networking service contacts without user consent, or requesting social networking service chat permissions; and generating a reputation score based on the profile metric, installation metric, application metric, and permissions metric.

16. The computer readable storage medium of claim 15, wherein the operations further comprise identifying the application as a secure application if the reputation score is one of greater than or less than a threshold score.

17. The computer readable storage medium of claim 16, wherein the operations further comprise alerting a user about the application or blocking the user from installing the application if the reputation score is indicative of a malicious application.

18. The computer readable storage medium of claim 16, wherein the reputation score is a sum of the profile metric, installation metric, application metric and permissions metric.

19. The computer readable storage medium of claim 15, further comprising maintaining a data store comprising a plurality of application reputation scores.

20. The computer readable storage medium of claim 19, further comprising installing, if the application is not in the data store, the application in the profile area.

* * * * *